United States Patent
Tsihlas et al.

(10) Patent No.: US 7,073,382 B2
(45) Date of Patent: Jul. 11, 2006

(54) METHOD FOR DESIGNING A TIRE WITH REDUCED CAVITY NOISE

(75) Inventors: Dimitri Tsihlas, Greenville, SC (US); Eric Vinesse, Tokyo (JP)

(73) Assignee: Michelin Recherehe et Technique, S.A., Grange-Paccot (CH)

( * ) Notice: Subject to any disclaimer, the term of this patent is extended or adjusted under 35 U.S.C. 154(b) by 450 days.

(21) Appl. No.: 10/391,640

(22) Filed: Mar. 19, 2003

(65) Prior Publication Data

US 2004/0000366 A1 Jan. 1, 2004

Related U.S. Application Data

(63) Continuation of application No. PCT/US00/25645, filed on Sep. 19, 2000.

(51) Int. Cl.
| | |
|---|---|
| B29D 30/06 | (2006.01) |
| B29D 30/70 | (2006.01) |
| B60C 9/18 | (2006.01) |
| B60C 5/00 | (2006.01) |
| G01M 17/02 | (2006.01) |

(52) U.S. Cl. .......................... 73/579; 73/146; 152/450; 152/526; 156/64; 156/110.1; 156/123

(58) Field of Classification Search .................. 156/64, 156/110.1, 123; 73/579, 146; 152/450, 152/526

See application file for complete search history.

(56) References Cited

U.S. PATENT DOCUMENTS

| | | | |
|---|---|---|---|
| 2,290,121 A * | 7/1942 | Tripp ..................... 152/450 X |
| 4,392,522 A * | 7/1983 | Bschorr ................... 152/450 X |
| 4,721,143 A | 1/1988 | Fukushima et al. |
| 4,909,295 A | 3/1990 | Nirei et al. |
| 5,373,885 A * | 12/1994 | Yamashita |
| 5,394,918 A * | 3/1995 | Kogure ................... 152/526 X |
| 5,479,974 A * | 1/1996 | Noggle et al. .......... 152/450 X |
| 5,593,521 A | 1/1997 | Iseki |
| 5,746,848 A | 5/1998 | Schulze et al. |
| 5,871,606 A * | 2/1999 | Sakamoto et al. ...... 156/123 X |
| 5,891,278 A * | 4/1999 | Rivin |
| 5,938,870 A * | 8/1999 | Sakamoto et al. |
| 6,244,314 B1 * | 6/2001 | Dodt et al. ............. 152/450 X |
| 6,309,026 B1 * | 10/2001 | Svedhem |
| 6,343,843 B1 * | 2/2002 | Nishikawa ............... 152/450 X |
| 6,598,636 B1 * | 7/2003 | Schurmann et al. ........ 152/450 |
| 2002/0144760 A1 * | 10/2002 | Devizzi et al. |

FOREIGN PATENT DOCUMENTS

| | | |
|---|---|---|
| EP | 0 924 111 A1 | 6/1999 |
| EP | 0 989 000 A2 * | 3/2000 |

(Continued)

Primary Examiner—Adrienne C. Johnstone
(74) Attorney, Agent, or Firm—Adam Arnold; E. Mortin Remick; Frank J.

(57) ABSTRACT

A method for designing tires for reduced cavity noise is directed to tires of the type having architectural elements comprising at least one carcass structure anchored in each side of the tire in a bead, each bead having a base which is intended to be mounted on the tire's design mounting rim, a side wall portion extending radially upward from each bead, a reinforced summit comprising reinforcement cords disposed at a given angle, and the side wall portions joining the summit. The method includes the step of arranging the architectural elements to provide a flexibility level of at least a portion of the summit to allow said portion to vibrate at a frequency substantially corresponding to the cavity mode.

10 Claims, 6 Drawing Sheets

FOREIGN PATENT DOCUMENTS

| | | | | |
|---|---|---|---|---|
| JP | 60248410 | A | * | 12/1985 |
| JP | 62050203 | A | * | 3/1987 |
| JP | 63-154410 | A | * | 6/1988 |
| JP | 63137005 | A | * | 6/1988 |
| JP | 64078902 | A | * | 3/1989 |
| JP | 01254411 | A | * | 10/1989 |
| JP | 05024406 | A | * | 2/1993 |
| JP | 06156008 | A | * | 6/1994 |
| JP | 07052616 | A | * | 2/1995 |
| JP | 07061207 | A | * | 3/1995 |
| JP | 08175121 | A | * | 7/1996 |
| JP | 09086114 | A | * | 3/1997 |
| JP | 11139115 | A | * | 5/1999 |
| WO | WO-80/00236 | A1 | * | 2/1980 |

* cited by examiner

METHOD FOR DESIGNING A TIRE WITH REDUCED CAVITY NOISE

This application is a continuation of international application PCT/US00/25645, filed on Sep. 19, 2000.

BACKGROUND OF THE INVENTION

The invention relates to a method of designing tires having improved noise characteristics, in particular in relation with the first cavity mode frequency.

Cavity mode noise regularly causes difficulties to car manufacturers. As cars are to be more and more quiet, the noise generated by the resonance frequency of the air contained in the tire cavity becomes increasingly undesirable.

Different types of solutions have been developed by different manufacturers to reduce the cavity noise and/or other type of noise. For example, such solutions may use the following features:

foam material on rim;

Helmholtz or quarter-wave resonators either placed in the wheel or in an insert provided in the wheel cavity.

Most of the known solutions seem to give positive test results. However, they all require an additional element inside the tire/wheel assembly, or modifications of the wheel/rim assembly. A solution which would avoid using such an additional component or such a modification, would therefore be seriously considered by car manufacturers.

OBJECTS AND STATEMENT OF THE INVENTION

It is thus an object of the invention to provide a method for designing pneumatic tires having improved noise performance, and, in particular, reduced acoustic energy due to the first cavity mode frequency.

It is another object of the invention to provide a tire having improved noise performance, and in particular reduced acoustic energy due to the first cavity mode.

BRIEF SUMMARY OF THE INVENTION

In order to achieve this, the invention provides a method for designing tires, said tires having architectural elements comprising at least one carcass structure anchored in each side of the tire in a bead, each bead having a base which is intended to be mounted on the tire's design mounting rim, a side wall portion extending radially upward from each bead, a reinforced summit comprising reinforcement cords disposed at a given angle, the side wall portions joining said summit, wherein the method comprises arranging said architectural elements to provide a flexibility level of at least a portion of the summit to allow said portion to vibrate at a frequency substantially corresponding to the cavity mode.

Rather than incorporating a separate sound attenuating device in the tire or wheel, the solution in accordance with the invention modifies the tire architecture to avoid the generation of unwanted sound. A sound attenuating device is therefore no longer required.

In a preferred example, the flexibility level substantially corresponds to a circumferential stiffness of the tire.

According to the invention, the desirable flexibility level in the summit may be provided by arranging the summit reinforcement cords at an angle substantially between 25 and 45 degrees with respect to a circumferential direction and more preferably substantially equal to 30 degrees with respect to a circumferential direction.

The tire reinforcement cords are advantageously arranged so that the tire mode frequency substantially corresponds to the cavity mode frequency. By comparison, a standard prior art tire is usually "quasi-rigid" for cavity, i.e. its own natural mode is not in a frequency range similar to the cavity. Using the method of the invention, the tire is designed so that the tire natural mode at which the tire summit deforms is near the cavity mode.

Tests show that if a tire is designed so that the tire mode frequency is relatively near the cavity mode frequency, the vibration is substantially reduced or, better, suppressed compared to the conventionally designed tire.

Accordingly, and more specifically, the method comprises the steps of mounting and inflating a subject tire on a rim, loading the subject tire on a flat surface, determining the cavity mode frequencies and the tire mode frequencies, comparing the first cavity mode frequency with the tire mode frequency at which the summit deforms to determine a frequency difference, measuring or computing the tire circumferential stiffness, and modifying the architecture of the tire to reduce the circumferential stiffness at a central zone of the tire to minimize the frequency difference.

According to the invention, the flexibility level is preferably optimized in particular in the substantially central portion of the summit.

According to one embodiment, the summit reinforcement cords are advantageously disposed axially on each side of a substantially circumferential non-reinforced band. The non-reinforced band is preferably substantially axially central.

According to another embodiment, the summit reinforcement cords in an axially center portion are at a greater angle relative to the circumferential direction that are the summit reinforcement cords of portions on axially opposite sides of the center portion.

The invention also provides a method for designing tires, said tires having architectural elements comprising at least one carcass structure anchored in each side of the tire in a bead, each bead having a base which is intended to be mounted on the tire's design mounting rim, a side wall portion extending radially upward from each bead, a reinforced summit comprising reinforcement layers provided with reinforcement cords disposed at a given angle, the side wall portions joining said summit, wherein the tire architectural elements are adapted to optimize said tire's circumferential stiffness in order to obtain a frequency difference between the tire mode and the cavity mode minimized or at least lower than a given value.

This given value may for instance be selected in order to get a satisfactory acoustic energy level due to the first cavity mode.

The invention further provides a tire having architectural elements comprising at least one carcass structure anchored in each side of the tire in a bead, each bead having a base which is intended to be mounted on the tire's design mounting rim, a side wall portion extending radially upward each bead, a reinforced summit comprising reinforcement cords disposed at a given angle, the side wall portions joining said summit, wherein said architectural elements are arranged to provide a flexibility level of at least a portion of the summit to allow said portion to vibrate at a frequency substantially corresponding to the cavity mode.

The invention also provides a tire having architectural elements comprising at least one carcass structure anchored in each side of the tire in a bead, each bead having a base which is intended to be mounted on the tire's design mounting rim, a side wall portion extending radially upward from each bead, a reinforced summit comprising reinforcement layers provided with reinforcement cords disposed at a given angle, the side wall portions joining said summit, wherein the tire architectural elements are adapted to optimize said tire's circumferential stiffness in order to obtain a frequency separation between the tire mode and the cavity mode lower than a given value.

DETAILED DESCRIPTION OF THE INVENTION

Figure 1:
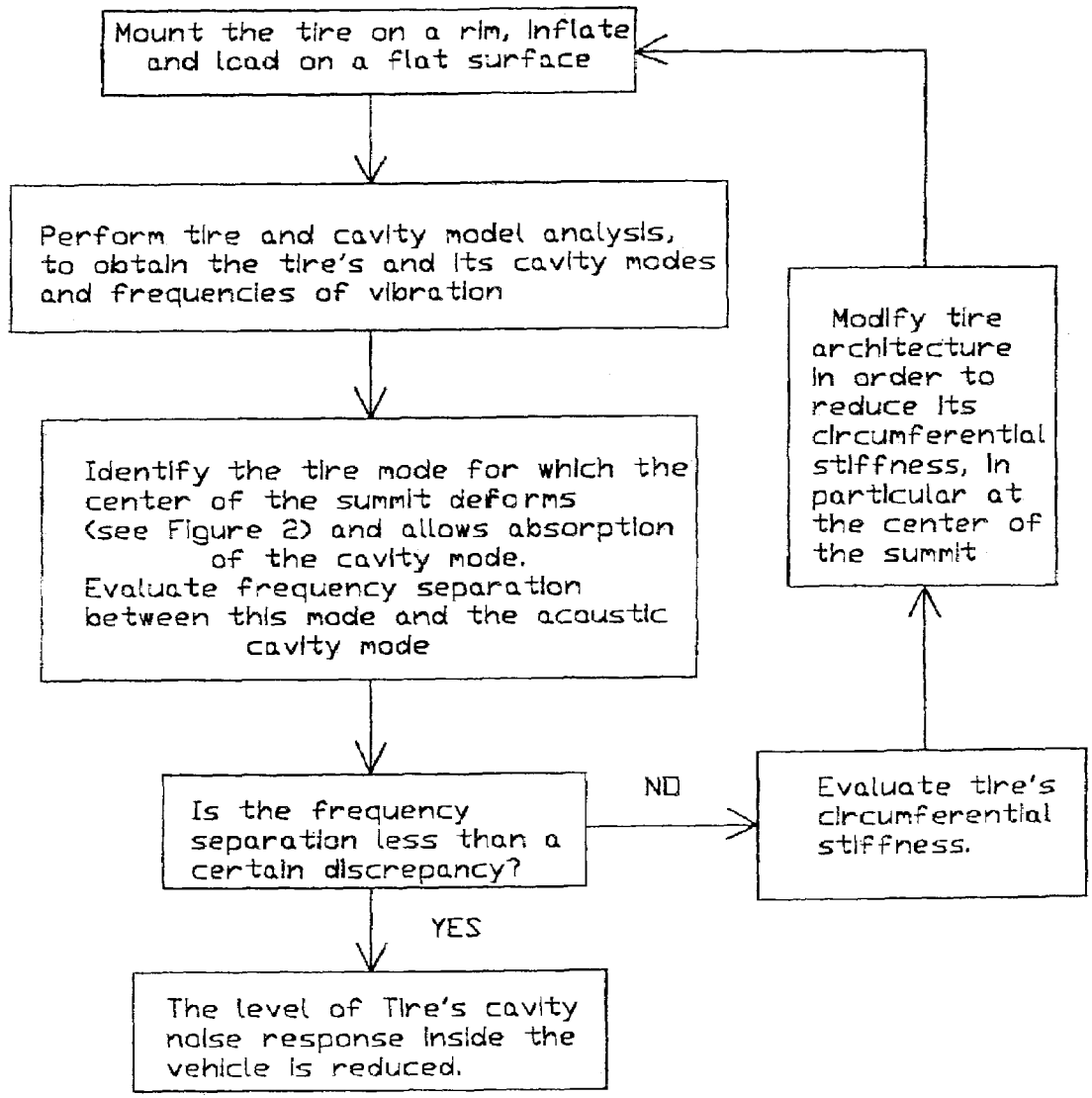
FIG. 1 illustrates a flowchart of the general methodology of the invention.

FIG. 1 is a flow chart illustrating the general methodology of the invention. The method may be carried out using either finite element simulation or experimentally. Different tire designs may be used as a starting point to compare the behavior of each tire with respect to noise due to cavity resonance. Alternatively, the method may be used to design a unique tire having advantageous cavity resonance characteristics.

The inventor discovered that a tire frequency mode at which the summit of the tire deforms can be determined for certain summit architectures, and further, that the noise transmitted from such a tire is related to a difference between the tire frequency mode and the cavity frequency mode. Further, the inventor discovered that the tire frequency mode can be changed by modifying the tire architecture, while the cavity frequency mode is fixed for a given interior volume, thus, allowing a method for controlling noise transmission.

According to the method of the invention, a first step is to test or evaluate the tire characteristics of a subject tire, which is mounted on a rim, inflated and loaded. A known type modal analysis of the tire and the cavity is performed, in order to identify and characterize the modes and frequencies of vibration of the tire and of the cavity.

Figure 2:
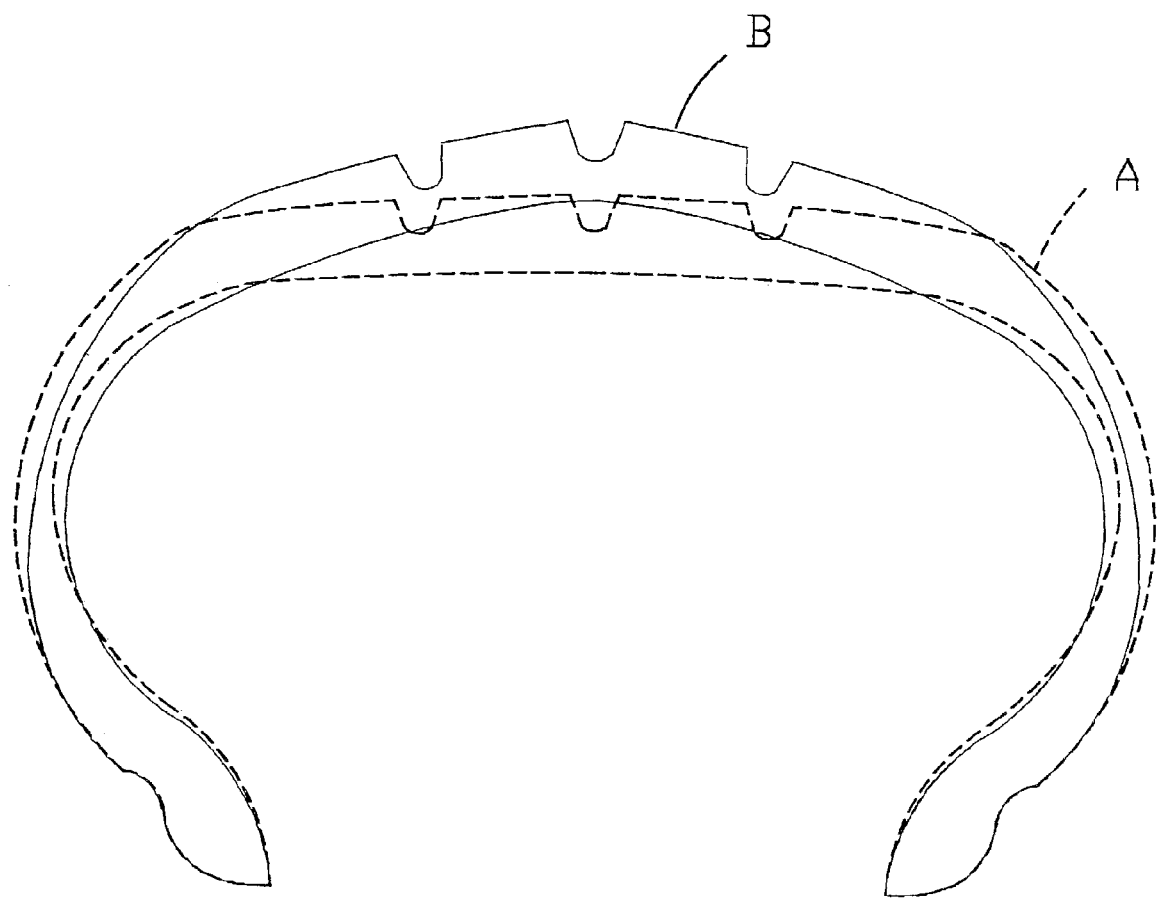
FIG. 2 illustrates a schematic tire modal deformation allowing absorption of the cavity acoustic energy.

Particular attention should be given to the substantially central portion of the summit, to identify the tire mode at which the center of the summit deforms and allows absorption (partial or total) of the cavity mode FIG. 2 illustrates schematically a vibration mode deformation of the tire that absorbs cavity acoustic energy. As may be seen, a substantially central portion of the summit deforms from an undisturbed state A (the flatter profile in broken lines) to a deformed state B (the portion bent upward in the figure). Of course, although not shown, in vibration the tread summit will oscillate between an outwardly deformed positioned and an inwardly deformed position.

The difference in frequency, or frequency separation, between this tire mode and the acoustic cavity mode is then evaluated. The value of the frequency separation is advantageously considered as a design parameter to optimize the tire characteristics. For example, if the separation is less than 60 Hz, the level of tire's cavity noise response inside the vehicle is substantially reduced. Test results showed that frequency separations less than 20 to 30 Hz provided excellent noise energy levels. As the frequency separation is reduced through modifications to the summit architecture, at a given value it may become difficult to further reduce the noise level generated by the cavity resonance.

According to this criterion, if the frequency separation is not optimized, this is an indication that there may be efficient ways to reduce the noise level due to cavity resonance.

The inventor has discovered that the frequency separation can be reduced by reducing the circumferential stiffness. A more flexible summit, in particular, in the substantially central portion of the summit relative to shoulder regions laterally adjacent to the central portion, generally contributes to reduce the frequency separation.

Tests performed with specific architectures showed that a reduction of the circumferential stiffness to less than 800 daN/mm, and most preferably between 300 to 500 daN/mm or less, in a center region contributed to significantly reduce the frequency separation. Moreover, and preferably, if the stiffness is reduced in the substantially axially central portion of the summit, for instance along a circumferential band about 80 mm wide, as compared to the circumferential stiffness of the regions on the axially opposing sides of the band, possibilities to reduce the frequency separation are optimized.

In some cases and for some vehicles, the method of the invention may provide a significant reduction of the noise level. Tests showed noise reductions of 2 to 6 db, depending on the tire and the vehicle.

FIGS. 3 to 6 illustrate examples of tires architectural features allowing a reduction of the circumferential stiffness. Of course, other architectural features may also contribute to circumferential stiffness and can be modified to obtain similar results. Those skilled in the art will also understand that in some specific cases, the stiffness reduction may be limited, for instance with some tire dimensions or because the tire comprises specific architectural elements or arrangements that increases the stiffness.

Referring in general to FIGS. 3 to 6, the tire 1 comprises beads 2, each provided with a seat 3, specially adapted to fit on the tire's mounting rim. A side wall 4 extends radially upward from each bead 2 and joins a summit 6.

The tire comprises at least one carcass structure 5, extending from bead to bead or leaving a gap between two half structures, for instance in the substantially median portion of the summit 6. The radially inwardmost extent of the carcass structure 5 terminates in an anchoring zone 7 of the bead 1.

The summit 6 architecture may vary depending on the type of tire, its dimensions, the desired characteristics and-performance, etc. FIGS. 3 to 6 illustrate examples of summit arrangements designed in accordance with the method of the invention.

Figure 3:
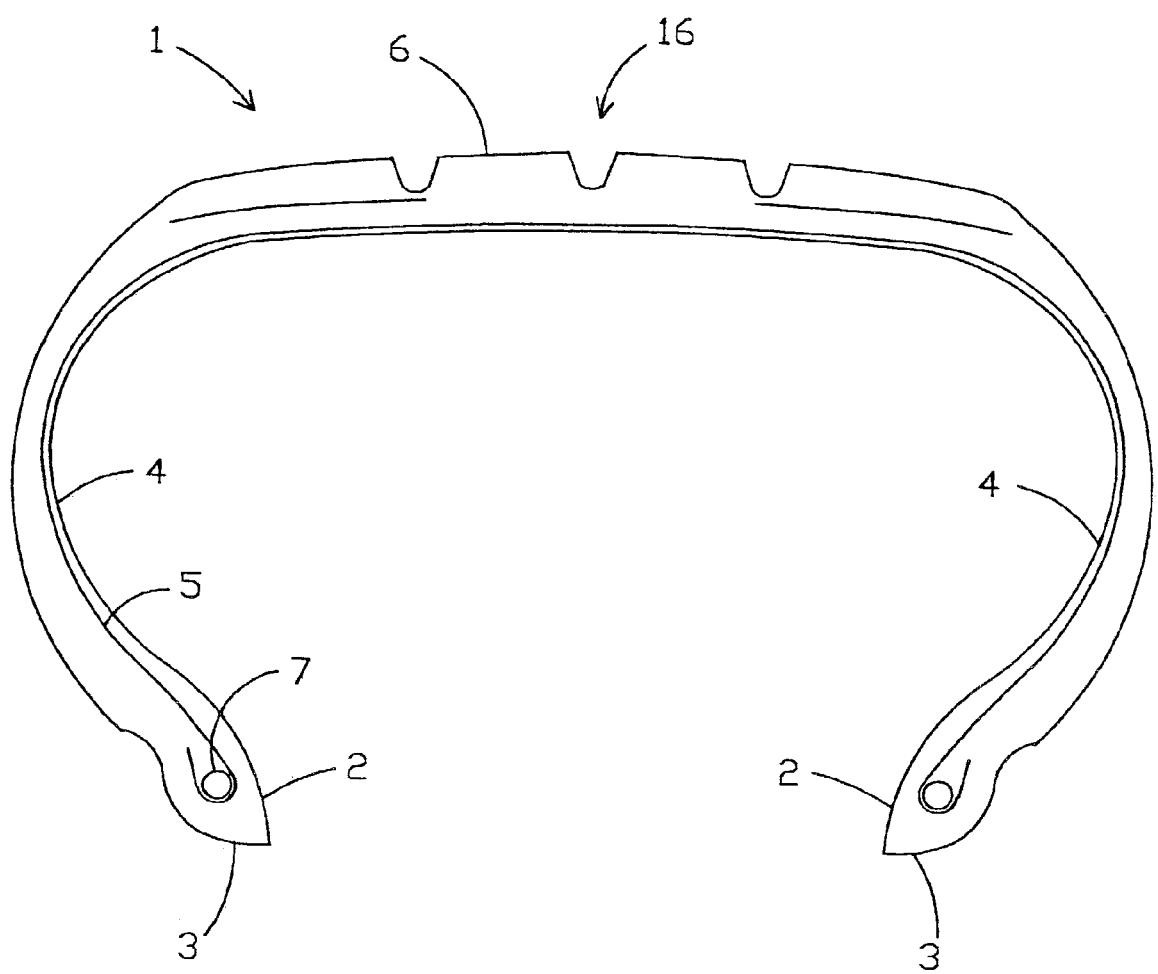
FIG. 3 illustrates an example of an arrangement of some tire architectural elements without reinforcement cords in the central portion of the summit.

FIG. 3 illustrates an example of a tire architecture in which the reinforcement cords at the center of the summit are eliminated, creating a circumferentially extending non-reinforced zone 16, for instance about 80 mm wide. The non-reinforced zone 16 has a circumferential stiffness less than 800 daN/mm. The adjacent reinforced zones have higher circumferential stiffness. The inventor has discovered that a less stiff zone at a center of the tire summit compared to shoulder areas would have a good acoustic behavior. However, a tire with a total suppression of the reinforcement in the center region could have a limited durability or endurance. Other architectural elements to compensate those aspects, could be used. Considering that tires are generally designed with compromises between many characteristics, often contradictory, FIGS. 4 to 6 illustrate other examples with some type of compromises in which the cavity noise have been considered with other design characteristics.

Figure 4:
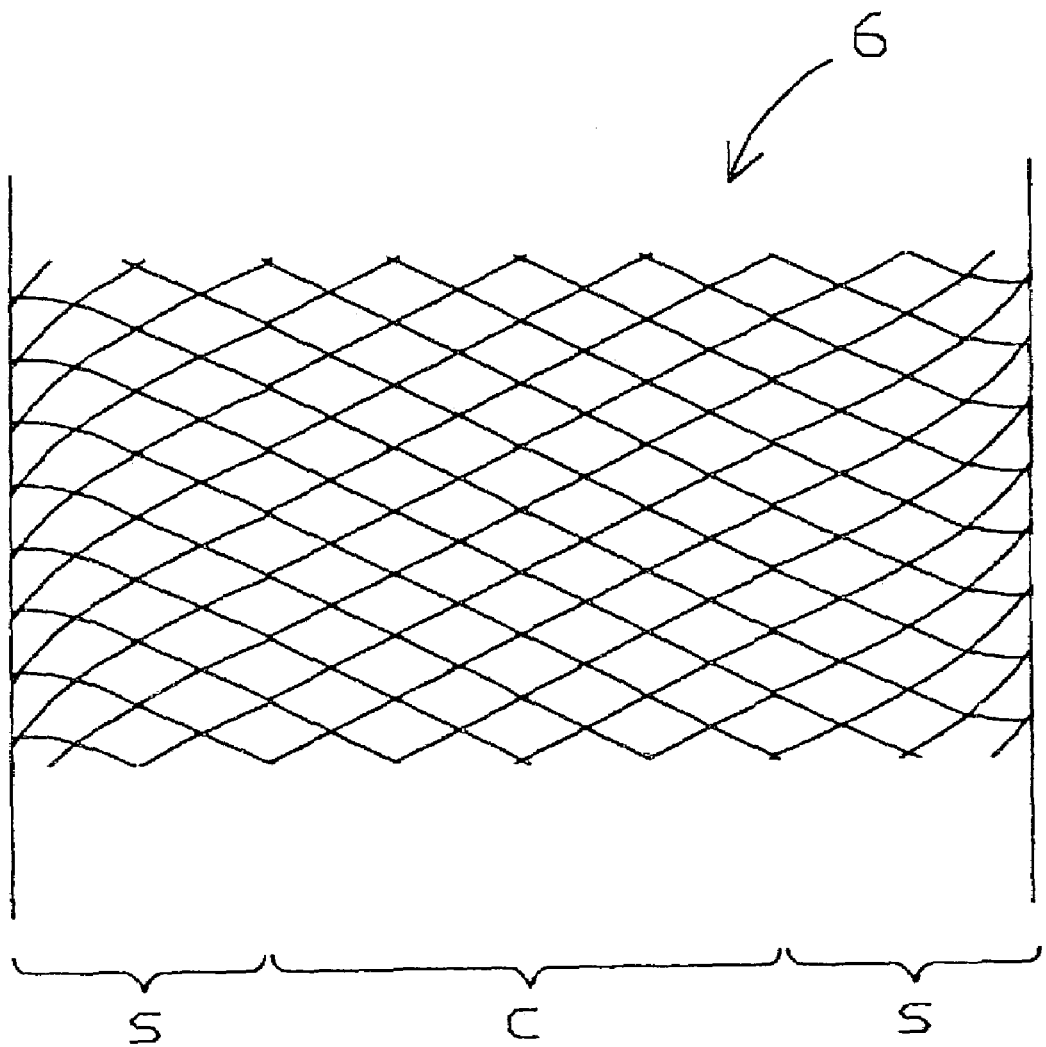
FIG. 4 illustrates schematically an arrangement in the summit of reinforcement cords with varying angles between the shoulder and the summit.

The example of FIG. 4 is provided, in the summit portion 6, with reinforcement cords which each are laid with varying angles from the shoulder to the center of the summit. Typical angles are between 0 to 25 degrees at the shoulder S and between 25 to 45 degrees in the center C. Preferably, the center region C is about 80 mm wide. Additional cords such as for instance cords disposed in the circumferential direction may also be provided. The reinforcing cords could be continuous cords laid to have varying angles across the summit. Alternatively, three adjacent bands of reinforcing cords could be provided at the two shoulder and center regions with the cords of the specific bands at the described angles.

Figure 5:
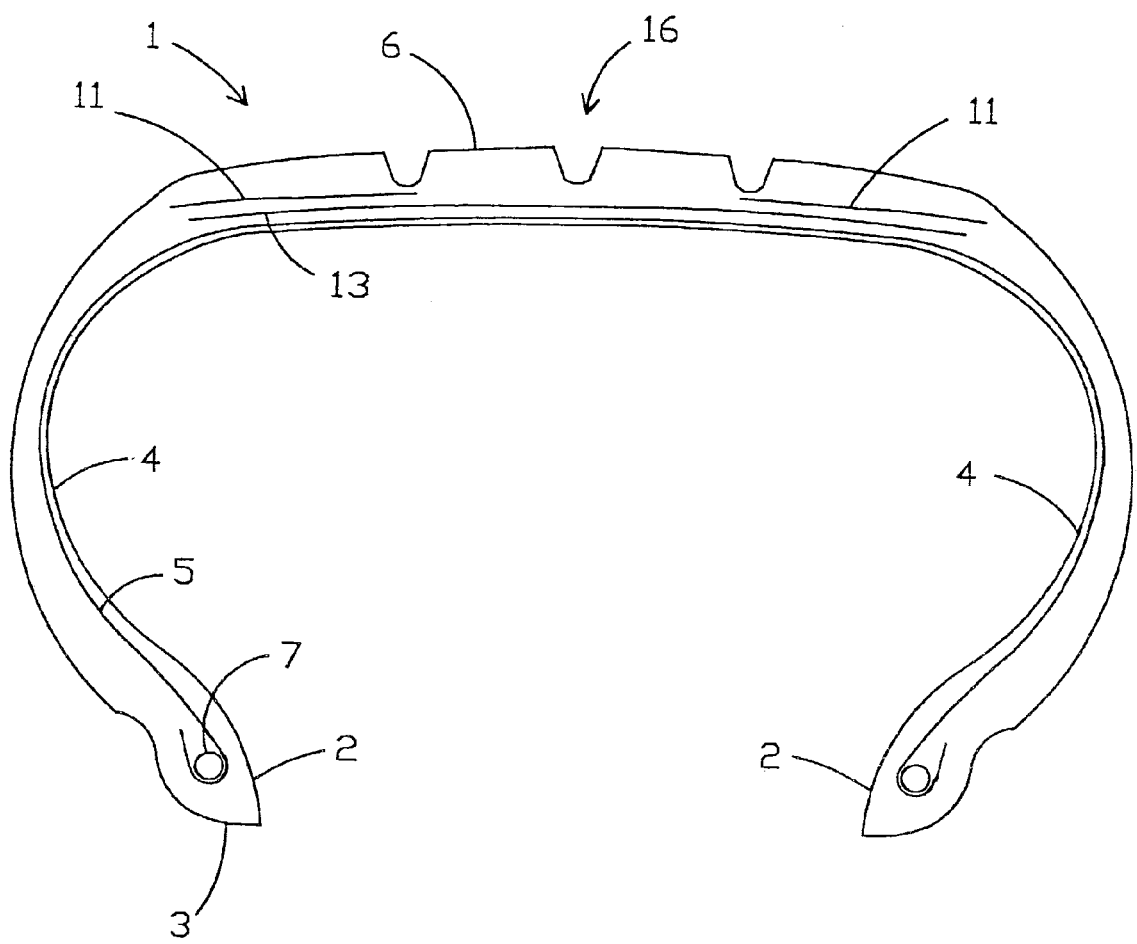
FIG. 5 illustrates a schematic cut view of a tire having additional reinforcement cords along the shoulder.

The example of FIG. 5 comprises, in addition to the carcass structure 5, one or more layers of reinforcement cords 13 disposed at an angle between 25 to 45 degrees. Additional sets of reinforcement cords 11 are placed in the shoulders of the tire to reinforce the axially outer regions, leaving the center portion with a lower circumferential stiffness. The cords 11 are advantageously oriented in the circumferential direction. Preferably, the sets of cords 11 are spaced to provide a flexible zone of about 80 mm at the center of the summit.

Figure 6:
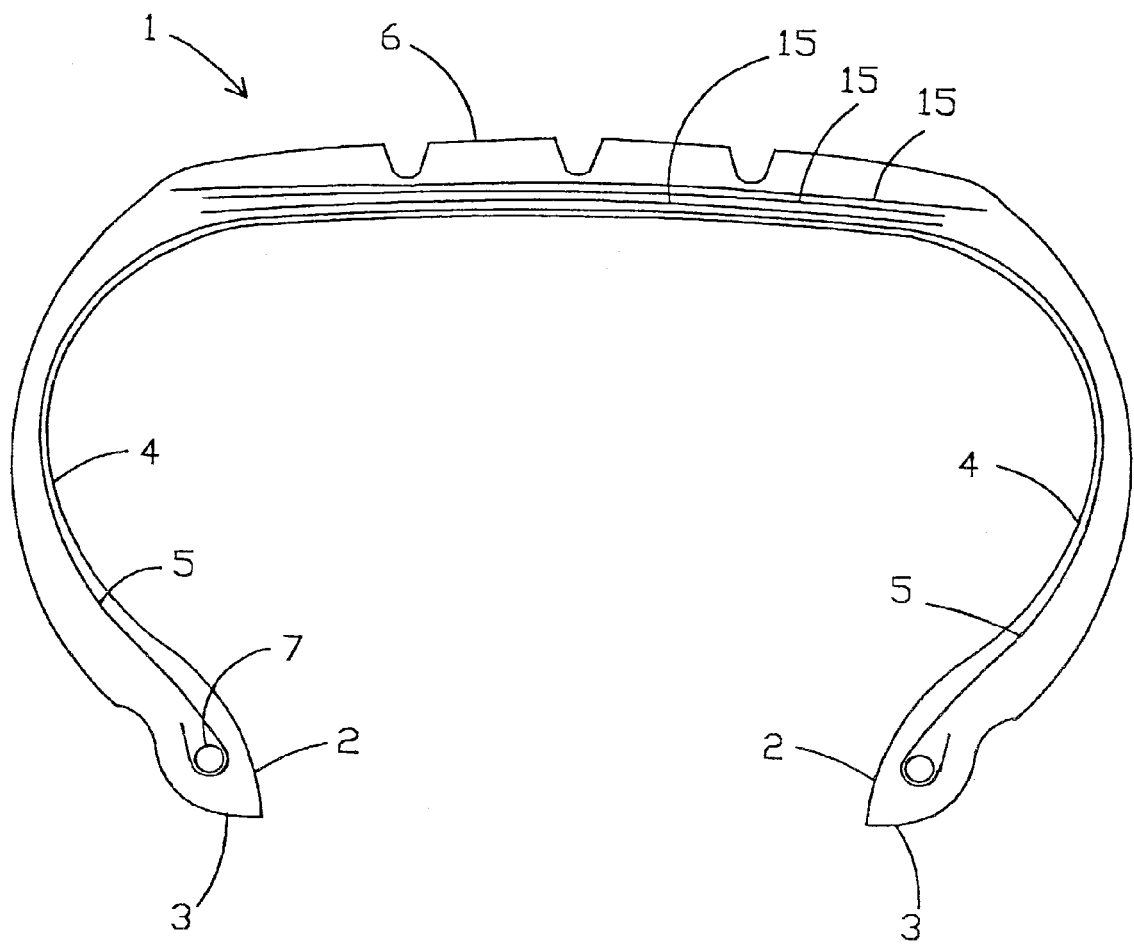
FIG. 6 illustrates a schematic cut view of a tire having a triple reinforcement configuration.

The example of FIG. 6 comprises, in addition to the carcass structure 5, a three-belt crown arrangement. The belts 15 may be made either of steel cords or textile cords or hybrid. Combinations with more than one material are also possible. The angles in each belt vary independently from 10 to 70 degrees. For example, a tire having three plies of metallic reinforcing cords oriented respectively at 27 degrees, −55 degrees, and 27 degrees showed a 2 dB decrease in noise as compared to a conventional two-belt tire having metallic reinforcing cords at 24 degrees and −24 degrees, respectively.

In the illustrated examples, the cords are advantageously made of steel. Textile types cords, such as aramid, nylon, PET, PEN, or hybrids such as aramid/nylon, etc., may also be used.

The invention has been described in terms of preferred principles, embodiments, and structure, however, those skilled in the art will recognize that substitutions and equivalents may be used without departing from the scope of the invention defined in the following claims.

What we claim is:

1. A method for designing tires, said tires having architectural elements comprising at least one carcass structure anchored in each side of the tire in a bead, each bead having a base which is intended to be mounted on the tire's design mounting rim, a side wall portion extending radially upward from each bead, a reinforced summit comprising reinforcement cords disposed at a given angle, the side wall portions joining said summit, the method comprising the steps of arranging said architectural elements to provide a flexibility level of at least a portion of the summit to allow said portion to vibrate at a frequency substantially corresponding to the cavity mode.

2. The method of claim 1, wherein said flexibility level substantially corresponds to a circumferential stiffness of the tire.

3. The method of claim 1, wherein said flexibility level is optimized in the substantially central portion of the summit to provide a flexibility difference between the central portion and axially outer portions of the summit.

4. The method of claim 1, wherein the tire reinforcement cords are arranged so that the tire mode frequency substantially corresponds to the cavity mode frequency.

5. The design method of claim 1, wherein the summit reinforcement cords are arranged at an angle substantially between 25 and 45 degrees with respect to a circumferential direction.

6. The design method of claim 1, wherein the summit reinforcement cords are arranged at an angle substantially equal to 30 degrees with respect to a circumferential direction.

7. The design method of claim 1, wherein the summit reinforcement cords in an axially center portion are positioned at a greater angle relative to the circumferential direction than are the summit reinforcement cords of portions on axially opposite sides of the center portion.

8. The design method of claim 1, wherein the summit reinforcement cords are disposed axially on each side of a substantially circumferential non-reinforced band.

9. The design method of claim 8, wherein said non-reinforced band is substantially an axially central band approximately 80 mm wide.

10. A method for designing tires, said tires having architectural elements comprising at least one carcass structure anchored in each side of the tire in a bead, each bead having a base which is intended to be mounted on the tire's design mounting rim, a side wall portion extending radially upward from each bead, a reinforced summit comprising reinforcement cords disposed at a given angle, the side wall portions joining said summit, wherein said architectural elements are arranged to provide a flexibility level of at least a portion of the summit to allow said portion to vibrate at a frequency substantially corresponding to the cavity mode, the method comprising the steps of:

mounting a subject tire on a rim and inflating the tire,
loading the subject tire on a flat surface,
determining the cavity mode frequencies and the tire mode frequencies,
comparing a first cavity mode frequency with a tire mode frequency at which the summit deforms to determine a frequency difference,
measuring the tire circumferential stiffness, and
modifying the architecture of the tire to reduce the circumferential stiffness to minimize the frequency difference.

* * * * *